No. 821,982. PATENTED MAY 29, 1906.
G. W. BROWNE.
SOAP SHAVER.
APPLICATION FILED APR. 24, 1905.
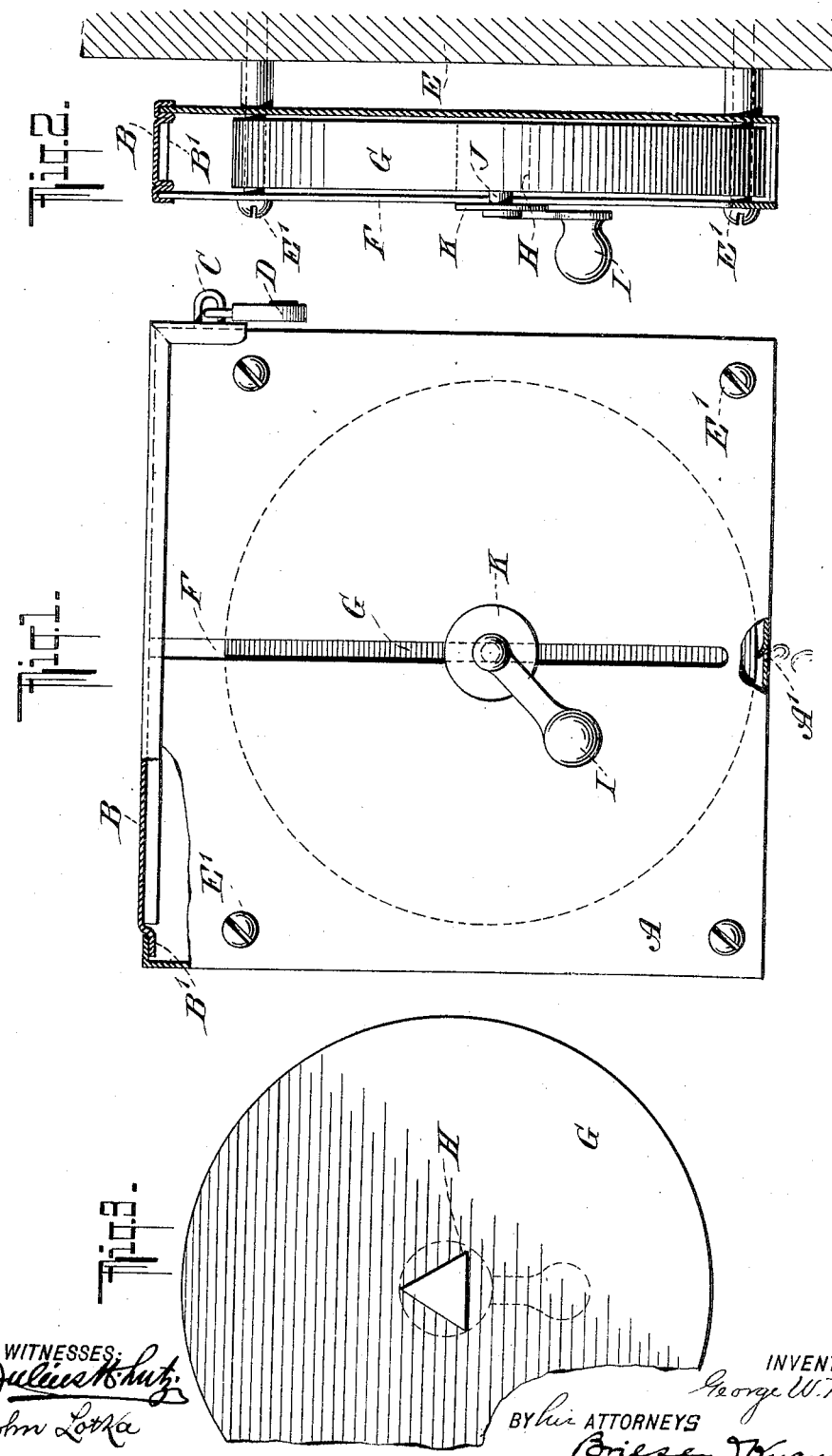
WITNESSES
Julius H Lutz
John Lotka
INVENTOR
George W. Browne
BY his ATTORNEYS
Briese & Knauth

UNITED STATES PATENT OFFICE.

GEORGE WASHINGTON BROWNE, OF NEW YORK, N. Y.

SOAP-SHAVER.

No. 821,982.  Specification of Letters Patent.  Patented May 29, 1906.

Application filed April 24, 1905. Serial No. 257,075.

*To all whom it may concern:*

Be it known that I, GEORGE WASHINGTON BROWNE, a citizen of the United States, and a resident of the borough of Brooklyn, county of Kings, city and State of New York, have invented certain new and useful Improvements in Soap-Shavers, of which the following is a specification.

My invention relates to soap-shavers such as are used in toilets of all public places, as hotels, cafés, &c., and has for its object to provide a device of the above description from which the soap is delivered to the user from a cake and in which the cake of soap itself does not contact with any part of the person of the user. This prevents the spreading of disease and does away with waste, &c.

My invention will be fully described hereinafter, and the features of novelty will be pointed out in the appended claims.

Reference is to be had to the accompanying drawings, in which—

Figure 1 is a front view of my device with parts in section. Fig. 2 is a sectional view of the same on line 2 2 of Fig. 1, and Fig. 3 is a view of the cake of soap used in my device.

A is a case or cabinet which may be made of any suitable material and is provided with a cover B, having at one end a lip B', which extends under a portion of the case A. At its other end the said cover B engages a staple C. A lock D may be used for locking said cover against removal from said case. The case or cabinet A may be secured upon a wall or other convenient place E by means of screws or other fastening devices E'. The case A is also provided approximately at its center with a vertical slot F, which is open at the upper end, but which is arranged to be closed by the cover B when said cover is in position. A portion of the bottom of the case A is bent inwardly, as shown at A', said inwardly-bent portion being provided with a knife-edge, the purpose of which will be more fully described hereinafter.

With my device as above described is used a cake of soap G, which is preferably made circular.

Into the central portion of this cake of soap G is adapted to be forced a portion or holder H, to which is secured a handle or crank I. The said portion H is preferably made of a form other than cylindrical—in this case triangular—to prevent the cake of soap from rotating relatively to said portion H. The portion H is also preferably provided with knife-edges, so that the said portion H may be easily inserted in the cake of soap. This portion H is weighted for the purposes to be hereinafter described. From this portion H projects a short cylindrical member J, which passes through the slot F and to which the crank or handle I is secured. A washer K is secured to the member J and serves as a guide for steadying purposes.

It will be seen that while the holder H, with the cake of soap, moves bodily in a vertical direction the holder's axis of rotation is horizontal—that is, the holder's axis of rotation is transverse to the direction of the bodily movement of the holder.

In operation the handle I is turned, thus revolving the cake of soap G, the periphery of which engages the knife-edge of the portion A' and cuts off the soap in small shavings, which can then be used for any purpose desired. As the cake of soap is used and gradually becomes smaller the weighted portion H serves to always maintain the periphery of the cake of soap in engagement with the portion A', the slot F serving as a guide as the center of the soap becomes lower through use of the soap.

It will thus be seen that in my device the main cake of soap never comes into contact with the person of the user, and the danger of the spreading of disease in this manner is thus entirely done away with. Furthermore, the device is cleanly, convenient, and economical.

Various modifications may be made without departing from the spirit of my invention.

I claim—

1. The combination with the case having a cutter or knife-edge, of a rotatable holder movable bodily toward said cutter as the material on said holder is used up the holder's axis of rotation being transverse to the direction of the bodily movement of the holder.

2. The combination with the case having a cutter or knife-edge and a guideway extending upwardly above said cutter, of a rotatable holder having an axial portion engaging said guideway and movable bodily toward said cutter by gravity as the material is used up the holder's axis of rotation being transverse to the direction of the bodily movement of the holder.

3. The combination with the case having a cutter or knife-edge, and a guideway extending upwardly above said cutter, of a rotatable weighted holder having a portion movable on said guideway toward the cutter and an operating-handle for turning the holder the holder's axis of rotation being transverse to the direction of the bodily movement of the holder.

4. The combination with the case having a guideway extending up and down and a cutter or knife-edge at the lower portion of said guideway, of a rotatable holder, the axis whereof extends transversely of said guideway and moves lengthwise thereof.

In testimony whereof I have signed my name to this specification in the presence of two subscribing witnesses.

GEORGE WASHINGTON BROWNE.

Witnesses:
 JOHN LOTKA,
 JOHN A. KEHLENBECK.